United States Patent
Serpico

(10) Patent No.: US 10,652,326 B2
(45) Date of Patent: *May 12, 2020

(54) POINTING DEVICE ROUTER FOR SMOOTH COLLABORATION BETWEEN DEVICES

(71) Applicant: International Business Machines Corporation, Armonk, NY (US)

(72) Inventor: Michelangelo Serpico, Sermoneta (IT)

(73) Assignee: International Business Machines Corporation, Armonk, NY (US)

( * ) Notice: Subject to any disclaimer, the term of this patent is extended or adjusted under 35 U.S.C. 154(b) by 112 days.

This patent is subject to a terminal disclaimer.

(21) Appl. No.: 14/699,280

(22) Filed: Apr. 29, 2015

(65) Prior Publication Data

US 2016/0110081 A1    Apr. 21, 2016

Related U.S. Application Data

(63) Continuation of application No. 14/519,513, filed on Oct. 21, 2014.

(51) Int. Cl.
*G06F 3/033* (2013.01)
*H04L 29/08* (2006.01)
(Continued)

(52) U.S. Cl.
CPC .......... *H04L 67/1078* (2013.01); *G06F 3/033* (2013.01); *G06F 3/038* (2013.01);
(Continued)

(58) Field of Classification Search
CPC .............. G06F 17/30058; G06F 3/017; G06F 3/04883; G06F 21/08; G06F 13/385;
(Continued)

(56) References Cited

U.S. PATENT DOCUMENTS

| 5,748,189 A | * | 5/1998 | Trueblood | G06F 3/038 715/755 |
| 7,557,774 B2 | * | 7/2009 | Baudisch | G06F 3/038 345/1.1 |

(Continued)

FOREIGN PATENT DOCUMENTS

| EP | 1739527 | 3/2007 |
| EP | 1892607 | 2/2008 |

(Continued)

OTHER PUBLICATIONS

Input Director—Software KVM to Control Multiple Computers, Jul. 7, 2014, http://www.inputdirector.com/.

(Continued)

*Primary Examiner* — Backhean Tiv
*Assistant Examiner* — Linh T. Nguyen
(74) *Attorney, Agent, or Firm* — Anthony V. England; SVL IPLaw

(57) ABSTRACT

The present disclosure relates to optimizing collaborative activities between computing devices (e.g., desktop computers, laptop computers, smart TV's, tablets, mobile devices), and more particularly to systems, methods, and computer products for inputting data or commands on a computing device, and for moving, sharing, and controlling files between computing devices through the use of a pointing device with a corresponding pointer that can be shared between "N" computing devices.

9 Claims, 6 Drawing Sheets

(51) Int. Cl.
*G06F 3/038* (2013.01)
*G06F 3/0354* (2013.01)

(52) U.S. Cl.
CPC ........ *G06F 3/0383* (2013.01); *G06F 3/03543* (2013.01); *G06F 3/03547* (2013.01); *H04L 67/06* (2013.01); *G06F 2203/0383* (2013.01); *G06F 2203/0384* (2013.01)

(58) Field of Classification Search
CPC .... G06F 3/1423; G06F 3/048; G06F 3/04892; G06F 3/0646; G06F 3/0484; G06F 3/0486; G06F 9/4443; G06F 3/0334; G06F 3/0346; G06F 3/0488; G06F 2203/0335; G06F 3/041; G06F 3/033; G06F 3/1454; G06F 17/24; G06F 11/3041; G06F 3/04845; G06F 1/1647; G06F 3/1438; G06F 3/1446; G06F 9/452; G06F 9/54; G06F 13/10; G06F 3/1236; G06F 13/102; G06F 2213/0042; G06F 9/4411; G06F 9/4415; H04L 65/403; H04L 5/0055; H04L 41/22; H04L 67/1063; H04L 67/1091; H04L 67/104; H04L 51/38; H04L 2012/2841; H04L 29/06; H04L 65/1069; G09G 5/14; G09G 2370/027; G09G 5/12; H04W 8/005; H04W 84/12; H04W 28/021
USPC ........ 715/856, 769, 810; 709/248, 245, 201, 709/208, 204, 217, 238, 227, 203, 219, 709/231, 205; 345/1.1, 157, 156, 163; 455/41.13

See application file for complete search history.

(56) References Cited

U.S. PATENT DOCUMENTS

| | | | |
|---|---|---|---|
| 8,312,392 B2 | 11/2012 | Forutanpour | |
| 8,464,184 B1 | 6/2013 | Cook | |
| 8,629,850 B2 | 1/2014 | Sengupta | |
| 2002/0089488 A1* | 7/2002 | McBrearty | G06F 3/038 345/157 |
| 2003/0225758 A1* | 12/2003 | Yamasaki | G06F 17/30286 |
| 2005/0007351 A1* | 1/2005 | Fabrick, II | G06F 3/038 345/181 |
| 2005/0156896 A1* | 7/2005 | Yu | G06F 3/04892 345/169 |
| 2005/0204026 A1* | 9/2005 | Hoerl | G06F 3/0227 709/223 |
| 2006/0007115 A1* | 1/2006 | Furuhashi | G06F 3/0346 345/156 |
| 2007/0139373 A1* | 6/2007 | Simon | G06F 1/1626 345/157 |
| 2008/0056215 A1* | 3/2008 | Kopikare | H04W 8/005 370/338 |
| 2008/0072175 A1* | 3/2008 | Corbett | G06F 3/048 715/810 |
| 2008/0094311 A1* | 4/2008 | Garbey | G06F 3/1438 345/1.3 |
| 2009/0046061 A1* | 2/2009 | Denoue | G06F 3/0304 345/158 |
| 2010/0077335 A1* | 3/2010 | Cheng | G06F 3/038 715/769 |
| 2010/0138743 A1 | 6/2010 | Chou | |
| 2010/0302461 A1* | 12/2010 | Lim | H04N 5/4403 348/734 |
| 2010/0332702 A1* | 12/2010 | Wu | G06F 3/023 710/73 |
| 2011/0047306 A1* | 2/2011 | Dickens | G06F 3/038 710/73 |
| 2011/0083111 A1* | 4/2011 | Forutanpour | G06F 1/1694 715/863 |
| 2012/0149304 A1* | 6/2012 | Baliga | H04M 1/7253 455/41.2 |
| 2012/0182119 A1* | 7/2012 | Vetter | H04W 4/80 340/4.3 |
| 2012/0284638 A1* | 11/2012 | Cutler | G06Q 10/00 715/751 |
| 2012/0319954 A1 | 12/2012 | Chen | |
| 2013/0110974 A1 | 5/2013 | Arrasvuori | |
| 2013/0214995 A1* | 8/2013 | Lewin | G06F 3/1446 345/1.3 |
| 2013/0278482 A1* | 10/2013 | Hsu | G06F 3/1423 345/1.3 |
| 2013/0307770 A1* | 11/2013 | Foster | G06F 13/14 345/156 |
| 2014/0253470 A1* | 9/2014 | Hamir | G06F 3/41 345/173 |
| 2014/0282090 A1* | 9/2014 | Waxman | H04L 65/403 715/753 |
| 2014/0325361 A1* | 10/2014 | Lee | H04M 1/72533 715/730 |
| 2014/0328296 A1* | 11/2014 | Chen | H04W 76/14 370/329 |
| 2014/0355389 A1* | 12/2014 | Reunamaki | G08C 23/02 367/197 |
| 2015/0082157 A1* | 3/2015 | Zhang | G06F 17/24 715/255 |
| 2016/0118793 A1* | 4/2016 | Davis | H04L 12/282 700/295 |

FOREIGN PATENT DOCUMENTS

| | | |
|---|---|---|
| EP | 1763945 | 6/2010 |
| EP | 2632133 | 8/2013 |

OTHER PUBLICATIONS

Samsung SideSync, Jul. 7, 2014, http://www.samsung.com/us/sidesync/.

File Sharing, Share Mouse, Jul. 7, 2014, http://www.keyboard-and-mouse-sharing.com/file-sharing.htm.

List of IBM Patents or Patent Applications Treated as Related, Apr. 29, 2015.

* cited by examiner

POINTING DEVICE ROUTER FOR SMOOTH COLLABORATION BETWEEN DEVICES

CROSS-REFERENCE TO RELATED APPLICATIONS

This application is a continuation of U.S. patent application Ser. No. 14/519,513, entitled "POINTING DEVICE ROUTER FOR SMOOTH COLLABORATION BETWEEN DEVICES" and filed Oct. 21, 2014, the disclosure of which is incorporated herein by reference in its entirety.

FIELD OF THE DISCLOSURE

The present disclosure relates to optimizing collaborative activities between computing devices (e.g., desktop computers, laptop computers, smart TV's, tablets, mobile devices), and more particularly to systems, methods, and computer products for inputting data or commands on a computing device, and for moving, sharing, and controlling files between computing devices through the use of a pointing device with a corresponding pointer that can be shared between "N" computing devices.

BACKGROUND

Conventional approaches for sharing files between computing devices and/or storage repositories include the following:

One approach is storing the files on a cloud computing system and retrieving the files from the cloud computing system when needed. The major drawbacks of such an approach include extranet access/availability, extranet bandwidth limitation, which is slow if compared with local intranet copy, and the need of an Internet connection.

A second approach is a "passport" mouse with a removable or resident memory attached to it (e.g. flash memory): the mouse stores a file from the source device to itself and then the file is copied to the destination device from the mouse's memory. This process has different drawbacks: two copies of the same file in place of one (source→destination), file size (to move) subject to mouse memory space and a late pairing process between the devices and the passport mouse (the mouse needs to be detached from the source and attached to the destination).

A third approach is installing a Master (or server) component on a device (e.g. a PC in the network) and a Slave (or client) component on each device it wants to share the pointer with. This approach has different drawbacks including: since it is a master-slave approach and not a peer-to-peer approach, the group can share the pointer (and the files) only if the Master device (e.g., the PC) is available and, often, only "from" the Master device. Furthermore, if there was a need to transfer a file between two Slaves devices, it first requires that the file be moved from the source Slave device to the Master, and then a move from the Master to the destination Slave device needs to be carried out.

Other conventional "solutions" are based on removable devices that require that the device (e.g., mouse, pen drive, external HDD) be removed from the source and plugged in the destination device, which implies a requirement of physical operation close to the devices that compromises the smooth behavior of the sharing operation.

Accordingly, there is a continued need for a system and method for solving the above referenced problems associated with conventional approaches for sharing files between computing devices and/or storage repositories.

BRIEF SUMMARY

Embodiments of the present invention include systems and methods that seek to, in part, address the above referenced problems associated with conventional approaches for sharing files between computing devices and/or storage repositories. These systems and methods are configured to input data or commands on a computer device, and to move, share, and control files between computing devices without using external shared storage devices (e.g. external HDD/SSD/NAS/SAN), removable storage memories (e.g. USB pen drive) or a device/computer acting as master (there is preferably direct file transfer between the peer devices without passing through a master device). There is preferably no file size limitation, and no need (i) for elements of the system to be physically geographically close to the other elements of the system, (ii) to un/plug pointing devices or flash memories to the devices, or (iii) of a Master device (e.g. a PC) that acts as group coordinator which the pointer device (as described further in the Detailed Description section below) is attached.

According to one embodiment, a method is provided for inputting data or commands on a computing device, and for moving, sharing, and controlling files between different computing devices, the method comprising the steps of: connecting a pointing device with a corresponding pointer to a network; pairing said pointing device with a plurality of network connected computing devices comprising at least a first computing device and a second computing device; and sending data or commands from said pointing device to one of said at least said first computing device and said second computing device when one of said at least said first computing device and said second computing device is selectively operated in a first status.

According to another embodiment, a computerized system for inputting data or commands on a computing device, and for moving, sharing, and controlling files between different computing devices, the system comprising: a pointing device with a corresponding pointer connected to a network; a plurality of computing devices comprising at least a first computing device and a second computing device, each of which is connected to said network and paired with and connected to said pointing device via said network; wherein said pointing device is programmed and/or configured to: send data or commands to one of said at least said first computing device and said second computing device when one of said at least said first computing device and said second computing device is selectively operated in a first status; and send data or commands to the other of said at least said first computing device and said second computing device when the other of said at least said first computing device and said second computing device is selectively operated in said first status.

According to a further embodiment, a non-transitory computer-readable storage medium containing program code is provided, and comprises: program code for connecting a pointing device with a corresponding pointer to a network; program code for pairing said pointing device with a plurality of network connected computing devices comprising at least a first computing device and a second computing device; and program code for sending data or commands from said pointing device to one of said at least said first computing device and said second computing device when one of said at least said first computing device and said second computing device is selectively operated in a first status.

The transmission/transfer of data, control signals, communication signals and/or monitoring signals from various portions/components of embodiments of the system described herein can be via wireless communication/transmission over a network, which can be any suitable wired or wireless network capable of transmitting communication, including but not limited to a telephone network, Internet, Intranet, local area network, Ethernet, online communication, offline communications, wireless communications, satellite communications and/or similar communications means. The wireless transmission can be accomplished through any wireless protocol/technology, including, but not limited to, ZigBee standards-based protocol, Bluetooth technology, and/or Wi-Fi technology. Further, this data can be encrypted as needed based on the sensitivity of the data or the location of the components of the system, for example. Components of the system can be located in the same room, in a different room in the same building, in a completely different building and location from one another. In the figures, such transmission/transfer of data, control signals, communication signals and/or monitoring signals, and connections between elements/devices/system components (which can be wired or wireless) are typically shown by arrows or non-straight lines connecting components.

The details of one or more embodiments are described below and in the accompanying drawings. Other objects and advantages of the present invention will in part be obvious, and in part appear hereinafter.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION

As will be described further herein and illustrated in the accompanying Figures, a pointing device (e.g., mouse, touchpad, touchscreen or other similar device as generally should be appreciated by those of skill in the art) with a corresponding pointer (i.e., a graphical image that is displayed on a computer or other device screen, which mimics the movement/actions of the pointing device for the purpose of inputting data or commands on a computer device, and for moving, sharing, and controlling files between computing devices) that can be shared between "N" computing devices is provided according to an embodiment.

Figure 1:
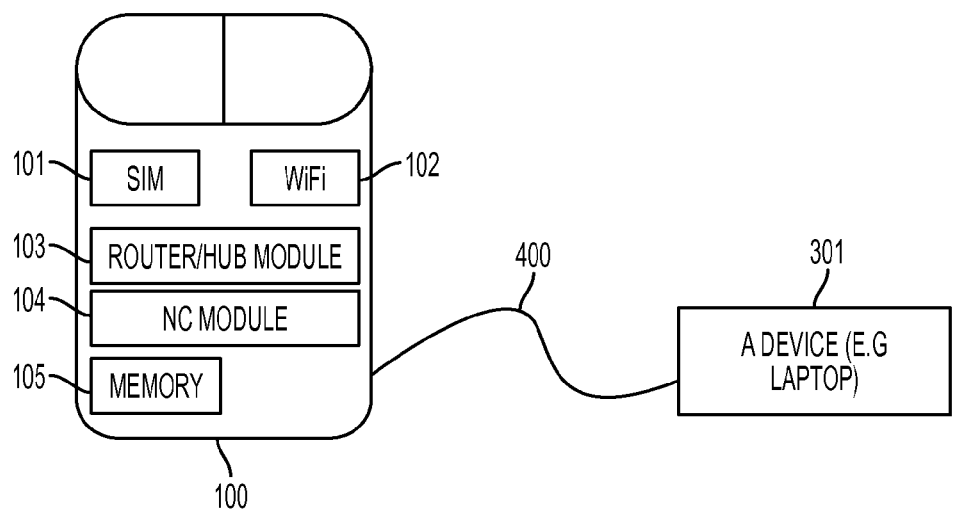
FIG. 1 is a schematic representation of a pointing device connected to a computing device according to an embodiment.

Referring now to the drawings, wherein like reference numerals refer to like parts throughout, there is seen in FIG. 1 a schematic representation of a pointing device 100 according to one embodiment. The pointing device 100 can include, but is not limited to, a SIM (Subscriber Identity Module) 101, a WiFi module 102, a router/hub module 103, a NC (Network Connection) module 104, and an optional memory module (e.g., a flash memory) 105 to store files (to, e.g., maintain a "group" configuration, related to the device(s) that the pointing device 100 is connected to/paired with, and algorithms in order to do pairing, security authentication, file transfer and other tasks that the pointing device 100 may be in programmed and/or configured to do as discussed further and illustrated herein). The router/hub module 103 and the SIM 101 (e.g., UMTS, LTE, etc.) can be optionally active in case of limited or no existing network presence in order to provide Internet/network access to certain computing devices with a group. The NC module 204 can support wireless connections, wired connections, or both.

The pointing device 100 can include a battery, however, it does not necessarily need a battery. For example, the pointing device 100 can be physically attached via a wired connection 400 to a computing device laptop 301 of a user from which the user decides where particular contents/files need to be deployed (e.g., toward another computing device such as a smart TV or a smart phone). The fact that the pointing device 100 can be physically attached to computing device 301 may be important, for example, in the case where the pointing device 100 acts as a WiFi router/hub. In such a case, the pointing device 100 can need an important amount of energy that can be supplied by the physical connection with a specific computing device 301. In any case, it is preferable that this wired connection 400 is feasible only for energy purposes and not for the command/data protocol discussed herein.

Figure 2:
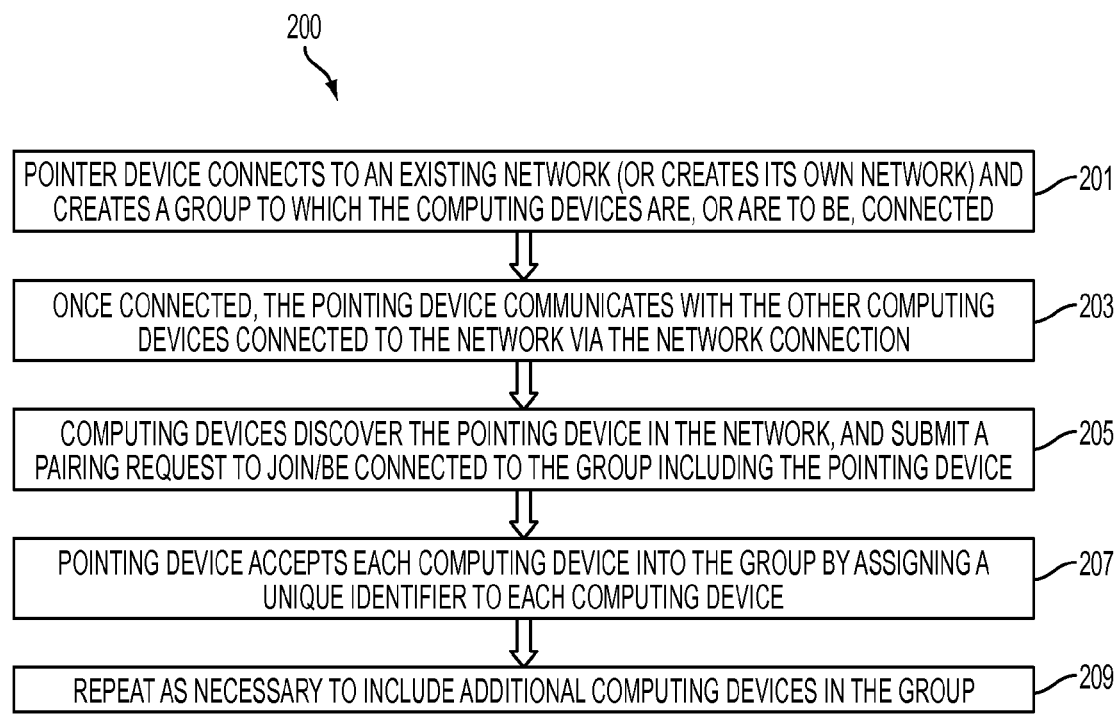
FIG. 2 is a flowchart depicting a method for pairing computing devices with a pointing device according to an embodiment.

The pointing device 100 is programmed and/or configured to be connected simultaneously to any number of "N" computing devices. In order to connect to such devices on an existing network (wired or wireless), the pointing device proceeds through a pairing process 200 once it is connected to a network. Turning to FIG. 2, in step 201 of a pre-pairing/pairing process 200, pointer device 100 connects to an existing network to which the computing devices are also connected or to be connected. Alternatively, if there is no existing network/network appliance then the pointing device 100 can be configured and/or programmed to perform a WiFi router/hub service/functionality and create a network through its router/hub module 103 and host the devices on its own network. In either scenario, the pointing device 100 is preferably not strictly paired with one specific device only. Pointing device 100 is part of a "group" (which includes the pointing device 100 and computing devices that together are to share files), and, like any other device in the network, will have a unique network address identification (e.g., an IP address—here "Network/WiFi address1"). In step 203, once connected to the network, the pointing device 100 is programmed and/or configured to communicate with the other computing devices (see FIG. 3) connected to the network via the network connection.

Figure 3:
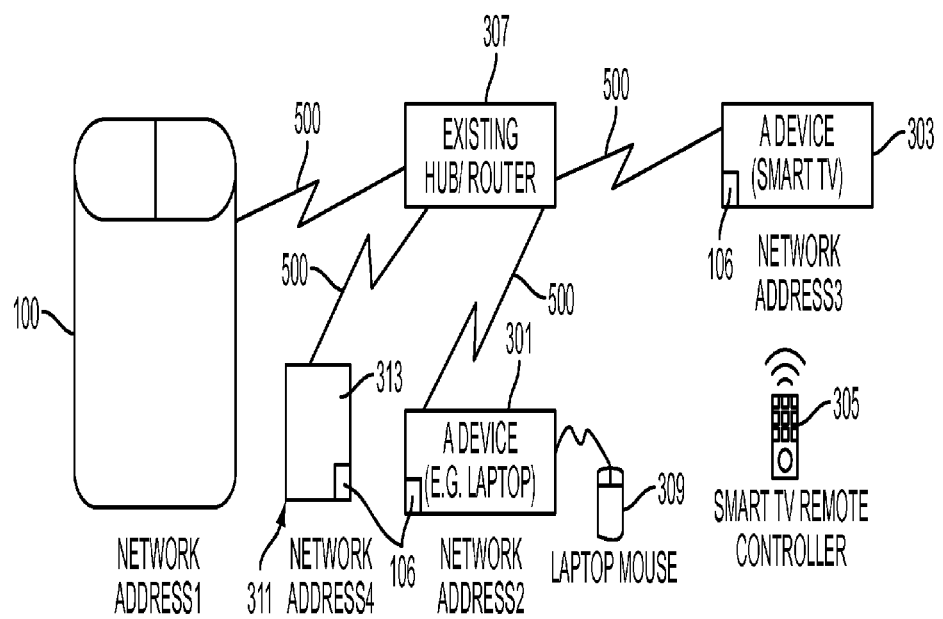
FIG. 3 is a schematic representation of a pointing device connected to multiple computing devices on a network according to an embodiment.

Referring to FIG. 3, the pointing device 100 is shown wirelessly 500 connected to the network through a separate hub/router 307 (a wired connection is also contemplated as noted above). The following computing devices with their own dedicated pointing devices—laptop 301 with a dedicate mouse 309, smart tv 303 with a dedicated remote controller 305, and mobile device/tablet 311 with a touch screen 313—are also shown wirelessly attached to the network though hub/router 307. Each computing device has a unique network address identification (e.g., an IP address). In this example, laptop 301 is assigned Network/WiFi address2, smart tv 303 is assigned Network/WiFi address3, and mobile device 311 is assigned Network/WiFi address4. The embodiments disclosed herein are not limited to the illustrated computing devices, as other computing devices and different numbers of computing devices are contemplated.

Each of the computing devices (301, 303, and 311) can also include a driver 106. The driver 106 can be similar to a typical mouse or other pointing device driver with the addition of one or more embedded/linked file transfer protocols. The driver 106 can be installed on the computing devices as required to use/be affected by the pointing device functionality described herein. The installation procedure can be any installation procedure used for a particular platform (e.g., smart phone, smart TV, etc, as should be understood by those of skill in the art). The file transfer protocol can be any type of file transfer protocol (e.g., FTP, SFTP, etc, as should be understood by those of skill in the art).

Turning back to FIG. 2, in order to use/be affected by the pointing device 100 functionality, in step 205, the actual pairing process begins as each computing device (301, 303, and 311) is configured and/or programmed to discover the pointing device 100 in the network per use of each computing device's respective driver 106, and to submit a pairing request to join/be connected to the group including the pointing device 100. In step 207, the pointing device is programmed and/or configured to accept each computing device (as may be desired by the user) into the group by assigning a unique identifier (e.g., any alphanumeric identifier) to each computing device. If at any time a new device joins the network, has a driver installed, and seeks to join the group, the same process can be performed/repeated (step 209) to pair the new device with the pointing device 100 and connect the new device with the group.

Figure 4:
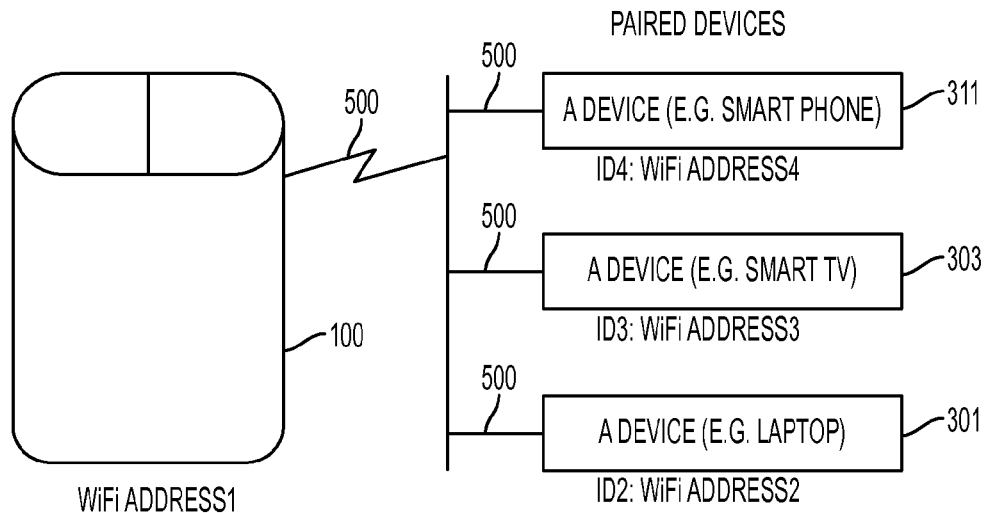
FIG. 4 is a schematic representation of computing devices paired and wirelessly connected to a pointing device according to an embodiment.

Turning to FIG. 4, a schematic representation is provided showing each of the example computing devices (301, 303, and 311) paired and wirelessly connected 500 to pointing device 100.

Once the pointing device 100 is paired with multiple "N" computing devices, the pointing device (with a corresponding pointer that can be shared between "N" computing devices) is programmed and/or configured to input data or commands on a computing device (i.e., the current computing device), and to move, share, and control files between the computing devices through the use of a pointing device, which is further described below.

Figure 6:
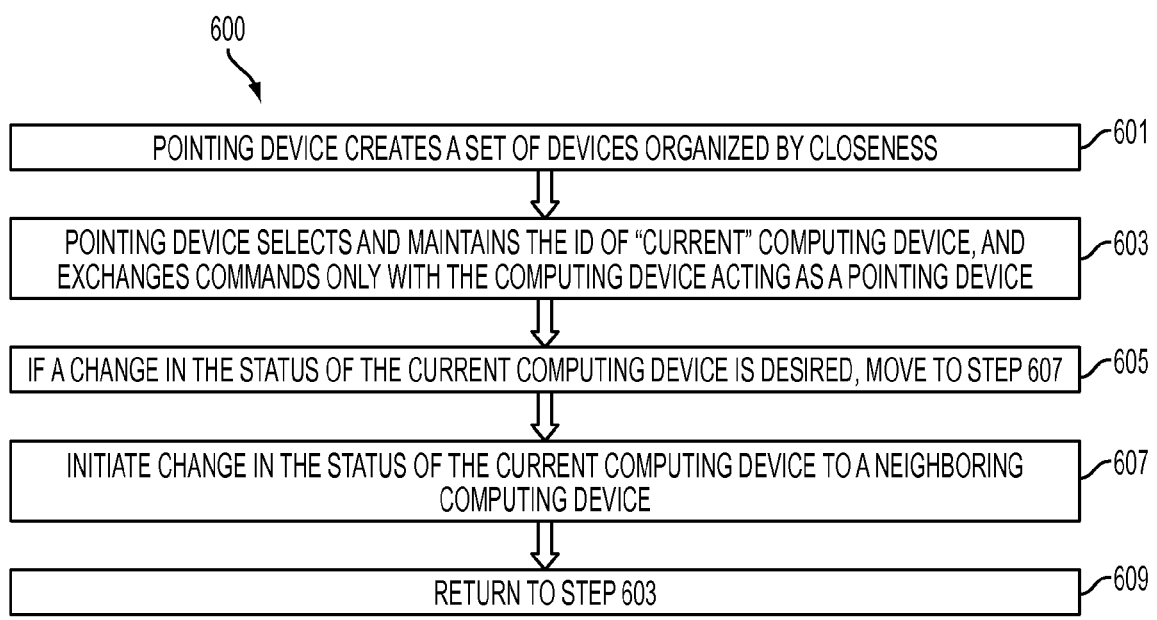
FIG. 6 is a flowchart depicting a method for illustrating certain functionality of the pointing device dictated by its programming and/or configuration according to an embodiment.

Turning to FIG. 6, a flowchart 600 is provided for illustrating the functionality of the pointing device dictated by its programming and/or configuration regarding organizing and setting-up the computing devices in the group for such inputting of data or commands and moving, sharing, and controlling files between computing devices. In step 601 of FIG. 6, the pointing device 100 is programmed and/or configured to create a set of devices (a list, matrix, etc.) organized by closeness 501. The concept of distance can be arbitrary. For example, "distance" can mean the order of arrival of the pairing requests from each computing device. In step 603, the pointing device 100 is programmed and/or configured to select and maintain the ID of "current" computing device 502 (the computing device for which the pointing device 100 is acting as a pointing device), and to exchange commands 503 only with the current computing device acting as a normal pointing device just for this device 504, until a change in the status of the current computing device is desired at step 605 (which is accomplished with reference to FIG. 7). At the same time, the other computing devices will be able to continue to use their own pointing devices (305, 309, or 313).

Figure 5:
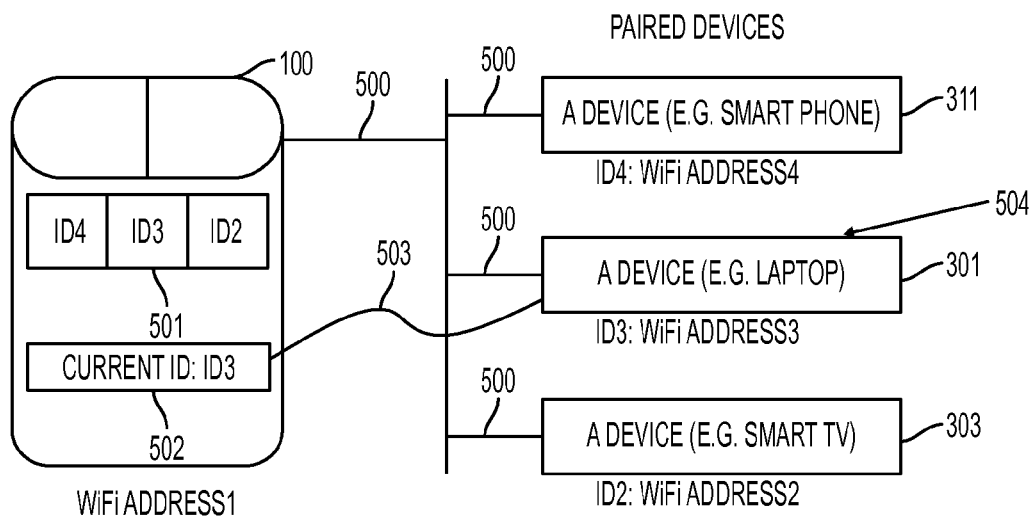
FIG. 5 is a schematic representation of computing devices with a current computing device paired and wirelessly connected to a pointing device according to an embodiment.

Similarly, FIG. 5 shows a schematic representation of the pointing device 100 programmed and/or configured to be connected 500 to the paired computing devices (301, 303, 311), organize the computing devices by "closeness" 501, maintain the ID of the "current" computing device 502 and to exchange commands 503 only with this current computing device 502 acting as a normal pointing device just for this current computing device 504. In this example, the current computing device is the laptop 301. The pointing device 100 and the current computing device 504 are connected via a network (as discussed above), but the pointing device, through the pointing device driver 106, is programmed and/or configured to act like a normal pointing device per the control and exchange of commands 503 from the connected pointing device 100.

Figure 7:
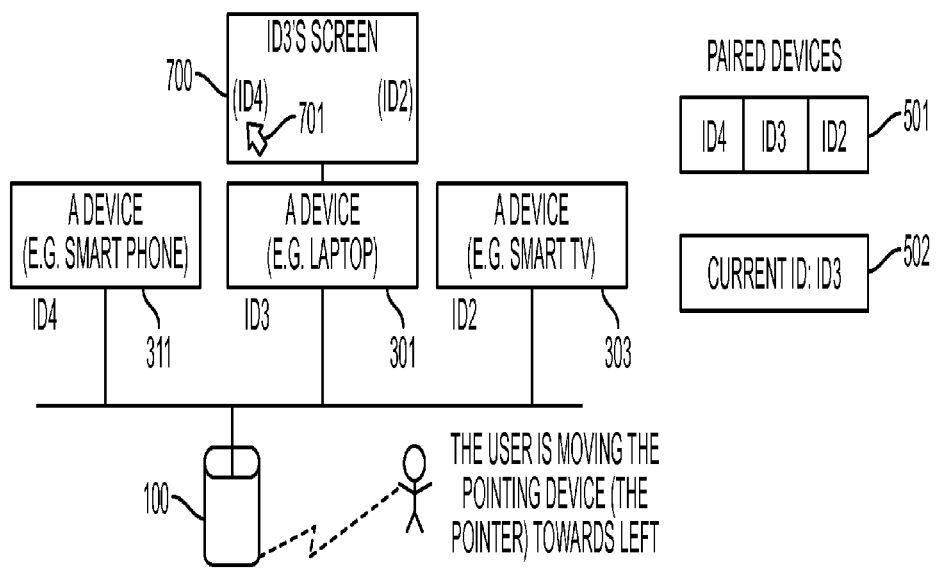
FIG. 7 is a schematic representation of computing devices with a current computing device paired and wirelessly connected to a pointing device according to an embodiment.

Turning to FIG. 7, a schematic representation is shown of computing devices (301, 303, 311) with a current computing device (301) paired and wirelessly connected to a pointing device 100 according to an embodiment. In this Figure, the laptop 301 (ID3) is the current computing device. Driver 106 of laptop 301 is programmed and/or configured to show the pointer 701 of the pointing device 100 on the screen of laptop 301, by which control of the laptop 301 per commands received from the pointing device is shown to be accomplished. Further, selectable neighbors 700 (e.g., smart tv 303 and smartphone 311), to which handover of the pointing device 100 can be accomplished (thus changing the "current" computing device from laptop 301 to either smart tv 303 or smartphone 311), can be shown on the screen of laptop 301 (or otherwise obtained or searched for per the use of a pairing assistant module which can be part of the driver 106 and which can be helpful in the case of a more complex list of computing devices that can be organized in a list or in a matrix). If, for example, the user moves the pointer 701 to the right side of the screen near the placeholder icon for the smart tv 303 (produced by the driver 106, e.g., via a widget), the pointer 701 can detect the smart tv 303 neighbor (here ID2). Once selected, the current computing device ID can change from ID3 to ID2 and the pointing device is programmed and/or configured to start to send commands to the new current device (i.e., smart tv 303). Alternatively, if ID4 is detected and chosen by the pointer 701 as shown in FIG. 7, the current computing device ID can change from ID3 to ID4 and the pointing device is programmed and/or configured to start to send commands to the new current device (i.e., smartphone 311). The pairing assistant module of the driver 106 of each computing device is programmed and/or configured to show the identity of the current computing device (e.g., by clicking the right mouse button or another specific button/control interface).

Turning back to FIG. 6, if the answer at step 605 is yes, a change in the status if the current computing device is desired, then move to step 607. If the answer is no, then stay at the current computing device (in this example, ID3). If the answer at 605 is yes, at step 607, the user of the pointing device 100 can initiate a change in the status of the current computing device to a neighboring computing device. This is accomplished by moving the pointer 701 to the right beyond the current device screen boundary or to an icon of ID2. The pointing device 100, by using a predefined set of paired computing devices 501, can detect that the neighbor on the right of the current devices is ID2. The pointing device 100 can set the current computing device to be the smart tv with ID2. The pointing device 100 can stop sending commands to ID3 and starts to send commands to device identified as ID2. The driver 106 on device ID3 can then release the pointer 701, and stop interpreting commands from the pointing device 100 (now directed to ID2), while the driver 106 on device ID2 takes the pointer 701 and starts to interpret commands received from the pointing device 100 (as ID2 is now the current computing device). It is contemplated that some or all of these sub-steps of step 607 may occur simultaneously or very close in time (including when the pointing device 100 acts as a WiFi router/hub). At step 609, return to step 603 after a new current computing device is chosen.

This process of sharing of the pointing device 100 (and, thus, the pointer 701) from one current computing device to another paired computing device within the group can be accomplished in a smooth manner without physical closeness of the computing devices/pointing device 100 or un/plug operations. As noted above, each computing device has its own pointer device (e.g., laptop 301 with a dedicated mouse 309, smart tv 303 with a dedicated remote controller 305, and mobile device/tablet 311 with a touch screen 313) working in autonomy from the others. When one of these computing devices becomes a current computing device (as discussed above), the pointing device 100 will move its pointer 701 on the current computing device's screen (and issue commands to the current computing device accordingly), and the current computing devices dedicated pointing device will no longer be operable as long as the computing device remains a current computing device.

Transferring files between paired computing devices can be accomplished per the use of the pointing device 100. In order to transfer (or share) a file between paired computing devices 100, the pointing device is programmed and/or configured to perform at least one or more of the following from this non-exhaustive list: (1) a drag & drop operation: by picking up/selecting a file on the source by, e.g., clicking a button on the pointing device 100 when the pointer 701 is on the desired file (source computing device which owns the file to share or where the file originated), moving the pointer 701 out of the screen toward the neighbor computing device, for example (as described above), until at the destination (destination computing device that receives the file to share), and releasing the file on the destination by releasing the pointing device 100 button; (2) a copy & paste operation: by copying/cutting the file on the source, moving the pointer 701 out of the screen toward the neighbor computing device, for example (as described above), until the at the destination (destination computing device that receives the file to share), and pasting the file on the destination; (3) a multicast operation: selecting the file on the source and from there to a distribution list. In these file transfer examples, the source and destination drivers 106 are programmed and/or configured to start a file transfer operation from the source to the destination via the network. The computing devices can continue to use their own pointing devices (unless the computing device is the current computing device, as discussed above). It is contemplated that this file transfer process will use the bandwidth of the network like any other file transfer operation between computers. Furthermore, the copy operation is directly from the source to the destination so there is preferably no file size limitation due to the pointing device's 100 (e.g. flash) memory size. There is no need of a master pc able to manage the pointing device, the collaboration process and relative software.

Advantages of embodiments of the invention are illustrated by the Example section below. However, the particular elements and amounts thereof recited in the Example, as well as other conditions and details, are to be interpreted to apply broadly in the art and should not be construed to unduly restrict or limit the invention in any way. Some of the same concepts and embodiments described above are summarized in this Example.

Example 1

This Example describes a specific group of devices that work together per the needs/desires of a particular user, here an architect. The group of devices includes a mobile device and/or a tablet, a laptop, and a smart tv (similar to the non-limiting examples discussed above). In this example, the architect sketches a rough draft of a house using a tablet for a customer, uses a more powerful laptop containing a CAD application to elaborate a more complex 3D file of the project from the initial draft, and uses a smart TV to show the 3D rendering of the project to the customer. The customer's smart phone can be used to receive the economics and a first draft of the project.

The pointing device will be attached/paired to all computing devices of this group (e.g., tablet, laptop, smart TV), of course other devices can come later (e.g., the customer's smart phone). The attachment process will include a network connection between the devices and the pointing device. In order to uniquely identify the computing devices, the pointing device will attribute to each computing device a unique ID (e.g., the IP address, a sequence number, a mnemonic name or a combination of them). With this in mind we can define, as discussed above: "current computing device" as the one to which the pointing device sends commands; the "neighbor of the current computing device" as each computing device close to the current computing device at a distance "D." The concept of "distance" is broad, and can be based on IP addresses, for example, so that 192.168.1.2 and 192.168.1.3 are neighbors, 192.168.1.2 and 192.168.1.1 are neighbors, but 192.168.1.1 and 192.168.1.3 are not. Or the distance could be just a subjective order defined by the user.

The pointing device can act as a virtual mouse or pointing device for each device of the group that accepts the connection. It is preferable that each device have a driver in order to be connected with the pointing device. The pointing device and the driver are programmed and/or configured to implement a file transfer protocol in order to realize a file transfer from the source to the destination. The file transfer protocol can be one as appreciated by those of skill in the art. The pointing device can be connected to all computing devices simultaneously (in terms of network connection) but it will exchange information with one of them (the "current computing device") at a time (in terms of receiving and responding to pointing device control/commands). The pointing device's position can be represented by a pointer (e.g., an arrow) on the computing device's screen. The pointing device can send commands (e.g. to move the arrow or to move the file) to only one device at time (AKA "current computing device"). As soon as the arrow exits from the screen of the current computing device toward a neighbor, for example, the pointing device is programmed and/or configured to (in conjunction with a current computing device's driver) will start to send commands to the neighbor as the current computing device. This will assure a smooth transaction between devices based on the fact the pointing device can be easily paired with all computing devices that are part of the same network and have the appropriate driver.

If and until a computing device is reached by the commands of the pointing device, the computing device will use its own pointing device. As soon as it is desired for the pointing device to send commands to a neighboring computing device, then an authentication process can take place or any other wireless security protocol can be used in order to assure security. The authentication process and the security procedures can be any such procedure as should be appreciated by those of skill in the art. Both the movements of the pointing device (e.g., pointer/mouse position, button clicks, etc.) and files will be exchanged over the network connection. The pointing device doesn't need to be connected via Bluetooth or via USB to the device in order to send data. The network connection can be used for both. The pointing device can have its own network address so it can send commands to any paired device on the network. The commands can be interpreted by the driver able to act as a virtual pointing device.

In this Example, the initial draft sketched on the tablet can be transferred to the laptop for further work (where the tablet is the source and initial current computing device, and the laptop is the destination and the second current computing device). The 3D rendering created on the laptop can be transferred to the smart tv (e.g., as a file.mov) for viewing through the use of the pointing device in the same manner. As such, the pointing device is shared between computing devices in order to complete a project (without the need to change to the specific dedicated pointing device). In essence, the architect user can control and use all of the computing devices he/she needs to by using only one pointing device. The architect user can do so even if he/she is not sharing any files/content—a video can be started on the smart tv, an email can be read on the tablet by movement of the pointing device from the smart tv (where the pointing device acted as a remote controller for the tv) to the tablet, and the pointing device can be moved to the laptop (and act as a normal mouse) to revise the CAD drawing.

In accordance with an embodiment, the pointier device is a separate device and is not per se specifically related to any other computing device. The pointing device can be paired with a plurality of computing devices (or a single computing device). For example, the pointing device can be paired with the 3 devices referenced above (1 laptop, 1 smart tv, 1 tablet) via WiFi. The pointer device can "serve" a computing device in place of another by moving the pointer: e.g. time-0) it is "serving" the laptop; time-1) the user moves the pointer out of the screen of the laptop toward the smart tv; time-2) the pointer starts to "serve" the tv, and so on (as discussed above).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium, includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of code systems, methods, and computer program products according to various embodiments of the present invention. In this regard, each block of the flowchart or block diagrams may represent a module, segment, or portion of instructions, which comprises one or more executable instructions for implementing the specified logical functions(s). In some alternative implementations, the functions rioted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations, can be implemented by special purpose hardware-based systems that perform the specified functions or acts or carry out combinations of special purpose hardware and computer instructions.

A module, as discussed herein, can include, among other things, the identification of specific functionality represented by specific computer software code of a software program. A software program may contain code representing one or more modules, and the code representing a particular module can be represented by consecutive or non-consecutive lines of code.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein, it is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A computer implemented method for inputting data or commands on a computing device, and for moving, sharing, and controlling files between different computing devices, the method comprising:

directly connecting a pointing device with a corresponding pointer to a network, a plurality of network connected computing devices being in communication with said connected pointing device over said network, said plurality of network connected computing devices comprising at least a first computing device and a second computing device, each of said at least said first computing device and said second computing device having a separate respective dedicated display screen, a respective pointing device driver including at least one file transfer protocol that is either embedded or linked, and being configured to discover said pointing device in said network per use of the respective pointing device driver;

receiving, by said pointing device from said first computing device and said second computing device via said network, a request to join a group including said pointing device, said request to join the group being received in response to said pointing device being discovered by said first computing device and said second computing device;

accepting, by said pointing device, said first computing device and said second computing device into the group by assigning a respective unique identifier to said first computing device and said second computing device in response to the receiving of the request to join from said first computing device and said second computing device;

using said pointing device to cause a transfer of a copy of a file from one of said at least said first computing device and said second computing device that is selectively operated as a current computing device to at least one selectable computing device in said group in response to using said pointing device to select said copy of said file from said one of said first computing device and said second computing device that is selectively operated as said current computing device and selecting said at least one selectable computing device in the group as a destination of said transfer of said copy of the file; and moving a position of the pointer on said separate respective dedicated display screen of said selectively operated current computing device responsive to receiving commands directly sent to said network from said pointing device to move the position of the pointer on said separate respective dedicated display screen of said selectively operated current computing device.

2. The method of claim 1, further comprising the step of sending data and commands from said pointing device to another of said at least said first computing device and said second computing device when said another of said at least said first computing device and said second computing device is selectively operated as said current computing device.

3. The method of claim 2, further comprising the step of selecting by said pointing device which of said plurality of computing devices in said group is to be operated as said current computing device.

4. The method of claim 3, wherein the step of selecting which of said plurality of computing devices in said group is to be operated as said current computing device further comprises the step of selecting a representation of a selectable computing device in said group, different from said one of said first computing device and said second computing device being operated as said current computing device, on said respective dedicated display screen of said one of said at least said first computing device and said second computing device, wherein said selection results in said selectable computing device in said group being operated as said current computing device and said one of said at least said first computing device and said second computing device no longer being operated as said current computing device.

5. The method of claim 4, further comprising the step of transferring a copy of a file from one of said at least said first computing device and said second computing device that is being operated as said current computing device to said at least one selectable computing device in said group per use of said pointer.

6. The method of claim 5, wherein the step of transferring further comprises the step of selecting said copy of said file from said one of said at least said first computing device and said second computing device that is being operated as said current computing device and moving said copy of said file to said representation of said at least one selectable computing device in said group on said separate respective dedicated display screen of said one of said at least said first computing device and said second computing device that is being operated as said current computing device per use of said pointer.

7. The method of claim 1, wherein computing devices are selected from a group consisting of a laptop computer, a desktop computer, a smart tv, a tablet computer, and a mobile device.

8. The method of claim 2, further comprising:

transferring a file from said one of said at least said first computing device and said second computing device to said another of said at least said first computing device and said second computing device in response to using said pointing device to perform:

selecting the file on said one of said at least said first computing device and said second computing device operated as said current computing device by clicking a button on said pointing device when said pointer is on the file;

moving said pointer out of said separate respective dedicated display screen of the current computing device toward said another of said at least said first computing device and said second computing device until said pointer is at said another of said at least said first computing device and said second computing device; and releasing the button on said pointing device to release the file and cause the file to transfer from said one of said at least said first computing device and said second computing device to said another of said at least said first computing device and said second computing device.

9. The method of claim 2, further comprising:

transferring a file from said one of said at least said first computing device and said second computing device to said another of said at least said first computing device and said second computing device in response to using said pointing device to perform:

copying or cutting the file on said one of said at least said first computing device and said second computing device operated as said current computing device;

moving said pointer out of said separate respective dedicated display screen of the current computing device toward said another of said at least said first computing device and said second computing device until the pointer is at said another of said at least said first computing device and said second computing device; and pasting the file on said another of said at least said first computing device and said second computing device.

* * * * *